(12) United States Patent
Sohn et al.

(10) Patent No.: US 7,567,428 B2
(45) Date of Patent: Jul. 28, 2009

(54) DIELECTRIC CERAMIC COMPOSITION FOR LOW-TEMPERATURE SINTERING AND HOT INSULATION RESISTANCE AND MULTILAYER CERAMIC CAPACITOR USING THE SAME

(75) Inventors: Sung Bum Sohn, Gyunggi-do (KR); Young Tae Kim, Gyunggi-do (KR); Kang Heon Hur, Gyunggi-do (KR); Eun Sang Na, Gyunggi-do (KR); Tae Ho Song, Gyunggi-do (KR); Soon Mo Song, Gyunggi-do (KR)

(73) Assignee: Samsung Electro-Mechanics Co., Ltd., Gyunggi-do (KR)

(*) Notice: Subject to any disclaimer, the term of this patent is extended or adjusted under 35 U.S.C. 154(b) by 0 days.

(21) Appl. No.: 12/216,057

(22) Filed: Jun. 27, 2008

(65) Prior Publication Data

US 2009/0128988 A1 May 21, 2009

(30) Foreign Application Priority Data

Nov. 16, 2007 (KR) ...................... 10-2007-0117237

(51) Int. Cl.
*H01G 4/12* (2006.01)
*C04B 35/468* (2006.01)

(52) U.S. Cl. .................. 361/321.4; 361/311; 361/321.1; 361/321.5; 361/301.4; 361/306.1; 501/136; 501/137; 501/138; 501/139

(58) Field of Classification Search ............. 361/321.4, 361/321.1, 321.2, 321.5, 311–313, 301.1, 361/301.4, 306.1, 306.3; 501/136–139
See application file for complete search history.

(56) References Cited

U.S. PATENT DOCUMENTS

| | | | | |
|---|---|---|---|---|
| 6,544,916 | B1* | 4/2003 | Sato et al. | 501/137 |
| 6,548,437 | B2* | 4/2003 | Sato et al. | 501/139 |
| 7,006,345 | B2* | 2/2006 | Nakano et al. | 361/321.5 |

(Continued)

FOREIGN PATENT DOCUMENTS

JP 2001-089231 4/2001

(Continued)

OTHER PUBLICATIONS

Korean Office Action issued in Korean Patent Application No. KR 10-2007-0117237, dated Apr. 13, 2009.

*Primary Examiner*—Nguyen T Ha
(74) *Attorney, Agent, or Firm*—McDermott Will & Emery LLP

(57) ABSTRACT

A dielectric ceramic composition for low-temperature sintering and hot insulation resistance (hot IR) is capable of carrying out low-temperature sintering, improving a hot IR characteristic, and meeting X5R characteristics, and a multilayer ceramic capacitor makes use of the dielectric ceramic composition. The dielectric ceramic composition includes a main component $BaTiO_3$, and sub-components, based on 100 moles of the main component, MgO of 0.5 moles to 2.0 moles, $Re_2O_3$ of 0.3 moles to 2.0 moles, MnO of 0.05 moles to 0.5 moles, $V_2O_5$ of 0.01 moles to 0.5 moles, BaO of 0.3 moles to 2.0 moles, $SiO_2$ of 0.1 moles to 2.0 moles, and borosilicate glass of 0.5 moles to 3.0 moles, where Re includes at least one selected from the group consisting of Y, Ho and Dy.

12 Claims, 1 Drawing Sheet

U.S. PATENT DOCUMENTS

| | | | |
|---|---|---|---|
| 7,061,748 B2 * | 6/2006 | Ito et al. | 361/321.4 |
| 7,336,476 B2 * | 2/2008 | Kim et al. | 361/321.4 |
| 2002/0041061 A1 | 4/2002 | Nomura et al. | |

FOREIGN PATENT DOCUMENTS

| | | |
|---|---|---|
| JP | 2002-060268 | 2/2002 |
| JP | 2002-356371 | 12/2002 |
| KR | 10-2002-0004467 A | 1/2002 |
| KR | 10-2004-0057102 | 7/2004 |

* cited by examiner

DIELECTRIC CERAMIC COMPOSITION FOR LOW-TEMPERATURE SINTERING AND HOT INSULATION RESISTANCE AND MULTILAYER CERAMIC CAPACITOR USING THE SAME

CROSS-REFERENCE TO RELATED APPLICATIONS

This application claims the priority of Korean Patent Application No. 10-2007-0117237, filed on Nov. 16, 2007, in the Korean Intellectual Property Office, the disclosure of which is incorporated herein by reference.

BACKGROUND OF THE INVENTION

1. Field of the Invention

The present invention relates to a dielectric ceramic composition and a multilayer ceramic capacitor, and more particularly, to a dielectric ceramic composition for low-temperature sintering and hot insulation resistance (hot IR), capable of carrying out low-temperature sintering, improving a hot IR characteristic, and meeting X5R characteristics of the Electronic Industry Association (EIA) standard, and a multilayer ceramic capacitor using the same.

2. Description of the Related Art

Recently, the electric and electronic devices have been rapidly made compact, lightweight and multifunctional. Multilayer ceramic capacitors (MLCCs) used for the electric and electronic devices have also rapidly proceeded to small size and high capacity. Thus, dielectric layers used in the MLCCs have been gradually decreased in thickness but increased in the number of layers. For example, a super high-capacity capacitor is realized by stacking at least 500 dielectric layers of $BaTiO_3$ having 2 μm or less. In order to obtain smaller scale, super high-capacity characteristics, a high-capacity dielectric layer having an ultra thin thickness of 1 μm or less must be secured.

In order to realize the MLCC using a dielectric having the ultra thin thickness, a dielectric ceramic composition that can be sintered at a temperature of 1100° C. or less is preferably used. In the case in which the dielectric ceramic composition is sintered at a temperature of 1100° C. or more, agglomeration of internal electrodes becomes serious, so that the MLCC is not only reduced in capacity but also increased in short circuit rate.

It is a hot IR characteristic that is considered when the super high-capacity MLCC is developed. When hundreds of ultra thin dielectric layers are stacked in order to obtain the super high-capacity MLCC, alternating current (AC) voltage is applied at a working temperature ranging from 100° C. to 150° C. Thereby, there is a possibility that the insulation resistance is abruptly reduced. The hot IR characteristic is used as a criterion for judging the reliability of the MLCC. Thus, the hot IR characteristic must be considered in order to realize the super high-capacity MLCC.

In order to provide the MLCC with high quality performance, the MLCC also requires temperature stability of capacitance. In addition, the MLCC requires X5R dielectric characteristics of the Electronic Industry Association (EIA) standard depending on its application. According to the EIA standard, the variation in capacitance ($\Delta C$) should be within ±15% at a temperature ranging from −55° C. to 85° C. (when a reference temperature is 25° C.).

These characteristics can be adjusted by varying a content or percentage of each sub-component, which is added to a main component, $BaTiO_3$, of the dielectric ceramic composition. However, one of the sub-components is added to ameliorate one of the physical properties but deteriorate another physical property. For example, the known dielectric ceramic compositions for fabricating the MLCC are used by mixing BaO and $SiO_2$, additives (sintering agents) for facilitating sintering, at a proper ratio. In this case, the ceramic dielectric layer itself has a high dielectric constant and a good insulation resistance characteristic under conditions of high temperature and high humidity.

In this case, however, since a proper sintering temperature is usually within a range of 1150° C. to 1200° C., and since a critical temperature for low-temperature sintering is 1150° C. or so, the dielectric ceramic composition is not suitable to fabricate the MLCC having an ultra thin dielectric layer having a thickness of 1 μm or less. In contrast, in order to promote low-temperature sinterability, glass based on silicate, borosilicate or phosphate system has recently been used as the sintering agent. These dielectric ceramic compositions effectively reduce the sintering temperature, but significantly reduce the hot IR characteristic of the MLCC compared to that using BaO and $SiO_2$ as the sintering agents.

Thus, in order to fabricate the MLCC having the super high capacity, the ultra thin thickness and numerous layers, it is necessary to develop the dielectric ceramic composition, which provides possibility of the low-temperature sintering and good hot IR characteristic as described above.

SUMMARY OF THE INVENTION

An aspect of the present invention provides a dielectric ceramic composition for low-temperature sintering and hot insulation resistance (hot IR), which is capable of carrying out low-temperature sintering, improving a hot IR characteristic, and meeting X5R characteristics, and a multilayer ceramic capacitor using the same.

According to an aspect of the present invention, there is provided a dielectric ceramic composition for low-temperature sintering and hot insulation resistance, which includes: a main component $BaTiO_3$; and sub-components, based on 100 moles of the main component, MgO of 0.5 moles to 2.0 moles, $Re_2O_3$ of 0.3 moles to 2.0 moles, MnO of 0.05 moles to 0.5 moles, $V_2O_5$ of 0.01 moles to 0.5 moles, BaO of 0.3 moles to 2.0 moles, $SiO_2$ of 0.1 moles to 2.0 moles, and borosilicate glass of 0.5 moles to 3.0 moles, where Re includes at least one selected from the group consisting of Y, Ho and Dy.

Here, the borosilicate glass sub-component may include $R_2O$, $B_2O_3$, and $SiO_2$, where R is the alkali metal. The alkali metal may include at least one selected from the group consisting of Li, Na and K. The borosilicate glass sub-component may be expressed by a formula of $aR_2O\text{-}bB_2O_3\text{-}cSiO_2$, where R is the alkali metal, and $a+b+c=100$, where $5 \leq a \leq 20$, $5 \leq b \leq 30$, and $50 \leq c \leq 80$.

Further, the $BaTiO_3$ main component may include particles having an average diameter ranging from 150 nm to 300 nm. The borosilicate glass sub-component may include particles having an average diameter ranging from 150 nm to 200 nm. The $SiO_2$ sub-component may include particles having an average diameter ranging from 10 nm to 200 nm.

In addition, the low-temperature sintering of the dielectric ceramic composition may be performed at a temperature ranging from 1050° C. to 1100° C.

According to another aspect of the present invention, there is provided a multilayer ceramic capacitor, which comprises: a plurality of dielectric layers; internal electrodes formed between the dielectric layers; and external electrodes electrically connected to the internal electrodes. Each dielectric layer comprises a dielectric ceramic composition for low-temperature sintering and hot insulation resistance. The dielectric ceramic composition comprises: a main component $BaTiO_3$; and sub-components, based on 100 moles of the main component, MgO of 0.5 moles to 2.0 moles, $Re_2O_3$ of 0.3 moles to 2.0 moles, MnO of 0.05 moles to 0.5 moles, $V_2O_5$ of 0.01 moles to 0.5 moles, BaO of 0.3 moles to 2.0 moles, $SiO_2$ of 0.1 moles to 2.0 moles, and borosilicate glass of 0.5 moles to 3.0 moles, where Re includes at least one selected from the group consisting of Y, Ho and Dy.

Here, each internal electrode of the multilayer ceramic capacitor may include nickel (Ni) or Ni alloy. Each external electrode may include Ni like the internal electrode. Further, each external electrode may include copper (Cu).

Each dielectric layer comprising the aforementioned dielectric ceramic composition may have a thickness ranging from 0.5 to 2 μm.

As can be seen from the foregoing description, the dielectric ceramic composition according to the present invention can be can be sintered at a temperature of 1100° C. or less, have an excellent hot insulation resistance characteristic, and meet X5R characteristics.

Thus, when the multilayer ceramic capacitor is fabricated using the dielectric ceramic composition for low-temperature sintering and hot insulation resistance, the $BaTiO_3$ dielectric layer is uniformly sintered at a relative low temperature. Thereby, a sintering shrinkage difference between the internal electrode and the dielectric layer can be reduced to inhibit agglomeration of the internal electrodes, so that dielectric ceramic composition can not only minimize a short circuit rate but also maximize the capacitance of the multilayer ceramic capacitor.

In addition, the multilayer ceramic capacitor can be fabricated such that it can show excellent electrical properties, remarkably improve the hot insulation resistance characteristic, and meet the X5R characteristics.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
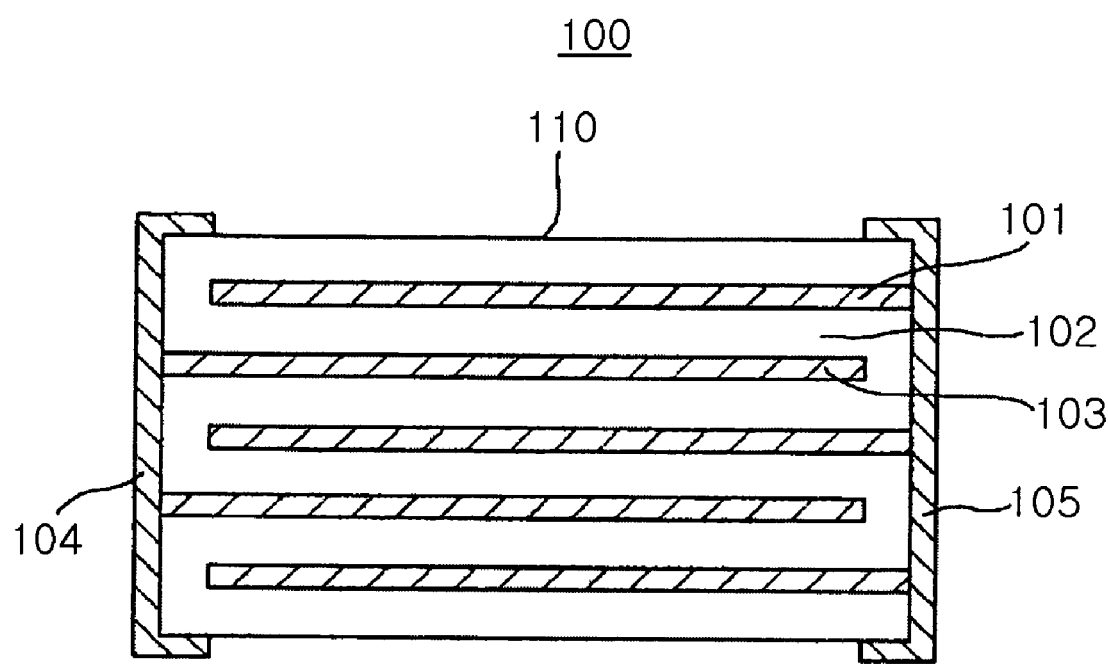
FIG. 1 is a cross sectional view illustrating an MLCC according to an embodiment of the present invention.

Exemplary embodiments of the present invention will now be described in detail with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. Thus, it should be noted that the thickness, height, or other dimensions of some components in the drawings can be exaggerated for clear description.

According to an aspect of the present invention, there is provided a dielectric ceramic composition for low-temperature sintering and hot insulation resistance (hot IR), which comprises a main component $BaTiO_3$ and sub-components, based on 100 moles of the main component, MgO of 0.5 moles to 2.0 moles, $Re_2O_3$ of 0.3 moles to 2.0 moles, MnO of 0.05 moles to 0.5 moles, $V_2O_5$ of 0.01 moles to 0.5 moles, BaO of 0.3 moles to 2.0 moles, $SiO_2$ of 0.1 moles to 2.0 moles, and borosilicate glass of 0.5 moles to 3.0 moles, where Re includes at least one selected from the group consisting of Y, Ho and Dy.

The dielectric ceramic composition according to an embodiment of the present invention comprises barium titanate ($BaTiO_3$) as a main component. $BaTiO_3$ is used as a dielectric for a multilayer ceramic capacitor (MLCC) required to have a super high dielectric constant due to a high dielectric constant. Particles of the main component $BaTiO_3$ preferably have an average diameter ranging from 150 nm to 300 nm. If the average diameter of the particles of the dielectric is too small, for instance 150 nm or less, the dielectric $BaTiO_3$ makes it difficult to secure capacitance thereof. In contrast, if the average diameter of the particles of the dielectric is too large, for instance 300 nm or more, the dielectric $BaTiO_3$ makes it easy to secure capacitance thereof, but has a possibility of increasing a sintering temperature and decreasing hot IR.

The dielectric ceramic composition according to an embodiment of the present invention comprises magnesium oxide (MgO) ranging from 0.5 to 2.0 moles based on 100 moles of the main component $BaTiO_3$. Hereinafter, the contents of the sub-components are expressed based on 100 moles of the main component $BaTiO_3$. MgO is added to the main component $BaTiO_3$, thereby inhibiting grain growth. The added amount of MgO preferably ranges from 0.5 to 2.0 moles. If the added amount of MgO is less than 0.5 moles, MgO reduces inhibition of the grain growth and specific resistance, and fails to meet X5R temperature characteristics. In contrast, if the added amount of MgO is more than 2.0 moles, MgO increases the sintering temperature, but reduces lifetime. An average diameter of added MgO powder ranges from 20 to 200 nm.

The dielectric ceramic composition according to an embodiment of the present invention comprises rare earth metal oxide ($Re_2O_3$) ranging from 0.3 to 2.0 moles, where Re includes at least one selected from the group consisting of rare earth metals, for instance, Y, Ho and Dy. $Re_2O_3$ is a component that contributes to forming a core-shell structure of $BaTiO_3$, and increases the hot IR and the average lifetime. The added amount of $Re_2O_3$ preferably ranges from 0.3 to 2.0 moles. If the added amount of $Re_2O_3$ is less than 0.3 moles, $Re_2O_3$ decreases the hot IR, or reduces the average lifetime at a high temperature (from 1100° C. to 1150° C.). In contrast, if the added amount of $Re_2O_3$ is more than 2.0 moles, $Re_2O_3$ increases a shell thickness of the $BaTiO_3$ particles to further stabilize a temperature coefficient of capacitance (TCC), but decreases the dielectric constant and sinterability of a $BaTiO_3$ sintered compact to make it difficult to perform the low-temperature sintering at a temperature of 1100° C. or less.

The dielectric ceramic composition according to an embodiment of the present invention comprises manganese oxide (MnO) ranging from 0.05 to 0.5 moles. MnO serves not only to contribute to improving non-reducibility of the $BaTiO_3$ dielectric due to reduction atmosphere sintering, but also increase room-temperature and hot IR of the dielectric. The added amount of MnO preferably ranges from 0.05 to 0.5 moles. If the added amount of MnO is less than 0.05 moles, MnO decreases the non-reducibility and the insulation resistance. In contrast, if the added amount of MnO is more than 0.5 moles, MnO increases an aging rate of capacitance (a variation rate of capacitance caused by the lapse of time), and a decrease rate of capacitance caused by application of direct current voltage.

The dielectric ceramic composition according to an embodiment of the present invention comprises vanadium oxide ($V_2O_5$) ranging from 0.01 to 0.5 moles. $V_2O_5$ serves to inhibit abnormal grain growth of the $BaTiO_3$ particles, because $V_2O_5$ is distributed along the grain boundary together with a liquid phase without being resolved in the $BaTiO_3$. Further, $V_2O_5$ increases insulating property of the grain boundary to contribute to increasing the hot IR, thereby improving the breakdown voltage and the average lifetime. The added amount of $V_2O_5$ preferably ranges from 0.01 to 0.5 moles. If the added amount of $V_2O_5$ is less than 0.01 moles, $V_2O_5$ makes it difficult to increase the hot IR. In contrast, if the added amount of $V_2O_5$ is more than 0.5 moles, $V_2O_5$ not only deteriorates the sinterability but also further decreases the hot IR.

The dielectric ceramic composition according to an embodiment of the present invention comprises barium oxide (BaO) ranging from 0.3 to 2.0 moles. A precursor of BaO can be obtained carbonate material such as $BaCO_3$ or nitrate material such as $NO_3$. Any material can be used as the precursor of BaO as long as it is heat-treated to generate barium oxide. BaO is added to the main component $BaTiO_3$, thereby partially functioning as a sintering additive. Further, when BaO is added beyond a predetermined amount, BaO serves to inhibit the grain growth of the main component $BaTiO_3$. The added amount of BaO preferably ranges from 0.3 to 2.0 moles. If added amount of BaO is less than 0.3 moles, BaO deteriorates the sinterability, and simultaneously facilitates the grain growth. In contrast, if the added amount of BaO is more than 2.0 moles, BaO is effective in inhibiting the grain growth, but excessively increases the sintering temperature and remarkably reduces the dielectric constant.

The dielectric ceramic composition according to an embodiment of the present invention comprises silicon dioxide ($SiO_2$) ranging from 0.1 to 2.0 moles. The added amount of $SiO_2$ preferably ranges from 0.1 to 2.0 moles. Further, the dielectric ceramic composition according to an embodiment of the present invention comprises borosilicate glass ranging from 0.5 to 3.0 moles.

$SiO_2$ and borosilicate glass serve as the sintering agent, and function to reduce the sintering temperature and ameliorate the sinterability. Generally, $SiO_2$ is mixed with BaO at a proper ratio when used. In this case, a lower temperature limit for the low-temperature sintering of $BaTiO_3$ ranges from 1130° C. to 1150° C. The dielectric sintered using $SiO_2$ as the sintering agent shows an excellent hot IR characteristic. In contrast, when borosilicate glass is used as the sintering agent, the lower temperature limit for the low-temperature sintering of $BaTiO_3$ is lowered to a temperature ranging from 100° C. to 1100° C., and can also degrade the hot IR characteristic of the dielectric after sintering. Thus, $SiO_2$ and borosilicate glass, as the sintering agent, are added at the same time. Thereby, the dielectric ceramic composition, which can be sintered at a low temperature of 1100° C. and improve the hot IR characteristic, can be obtained.

$SiO_2$ is preferably added in the type of fine powder sized from 10 nm to 200 nm. Alternatively, $SiO_2$ may be added in the type of a silicon dioxide sol ($SiO_2$ sol) or a silicon alkoxide compound. Further, the borosilicate glass is preferably added in the type of fine powder of about 200 nm, which is prepared through gas-phase treatment after melting or sol-gel method and spray pyrolysis method.

In the case in which $SiO_2$ and borosilicate glass are added at the same time, the added amount of $SiO_2$ preferably ranges from 0.1 to 2.0 moles, and the added amount of borosilicate glass preferably ranges from 0.5 to 3.0 moles. If the added amount of $SiO_2$ is less than 0.1 moles, $SiO_2$ makes it difficult to increase the hot IR. In contrast, if the added amount of $SiO_2$ is more than 2.0 moles, $SiO_2$ can increase the sintering temperature. Further, if the added amount of borosilicate glass is less than 0.5 moles, borosilicate glass increases the sintering temperature up to 1100° C. or more. In contrast, if the added amount of borosilicate glass is more than 3.0 moles, the borosilicate glass can deteriorate the sinterability, and abruptly decrease the hot IR of the dielectric.

Here, the borosilicate glass includes $R_2O$, $B_2O_3$, and $SiO_2$. The borosilicate glass can be expressed by a formula, for instance, $aR_2O\text{-}bB_2O_3\text{-}cSiO_2$, where R is the alkali metal, and a, b and c sum to 100, where $5 \leq a \leq 20$, $5 \leq b \leq 30$, and $50 \leq c \leq 80$. For example, R includes at least one selected from the group consisting of Li, Na and K. Further, an average diameter of borosilicate glass particles preferably ranges from 150 nm to 200 nm.

The dielectric ceramic composition containing the main component and the sub-components has a relatively low sintering temperature ranging from 1050° C. to 110° C., and shows an excellent hot IR characteristic.

According to another aspect of the present invention, there is provided a multilayer ceramic capacitor (MLCC), which comprises a plurality of dielectric layers, internal electrodes formed between the dielectric layers, and external electrodes electrically connected to the internal electrodes, wherein each dielectric layer is formed of a dielectric ceramic composition comprising a main component $BaTiO_3$ and sub-components, based on 100 moles of the main component, MgO of 0.5 moles to 2.0 moles, $Re_2O_3$ of 0.3 moles to 2.0 moles, MnO of 0.05 moles to 0.5 moles, $V_2O_5$ of 0.01 moles to 0.5 moles, BaO of 0.3 moles to 2.0 moles, $SiO_2$ of 0.1 moles to 2.0 moles, and borosilicate glass of 0.5 moles to 3.0 moles, where Re includes at least one selected from the group consisting of Y, Ho and Dy.

FIG. 1 is a cross sectional view illustrating an MLCC according to an embodiment of the present invention. Referring to FIG. 1, the MLCC 100 comprises a capacitor body having a structure in which dielectric layers 102 and internal electrodes 101 and 103 are alternately stacked. The capacitor body 110 is provided with external electrodes 104 and 105 on an outer surface thereof. The external electrodes 104 and 105 are electrically connected to the corresponding internal electrodes 101 and 103 as well as an external power source (not shown), thereby being supplied with voltage required for driving.

Each dielectric layer 102 includes the aforementioned dielectric ceramic composition. Here, the dielectric ceramic composition forming the dielectric layer 102 comprises a main component $BaTiO_3$ and sub-components, based on 100 moles of the main component, MgO of 0.5 moles to 2.0 moles, $Re_2O_3$ of 0.3 moles to 2.0 moles, MnO of 0.05 moles to 0.5 moles, $V_2O_5$ of 0.01 moles to 0.5 moles, BaO of 0.3 moles to 2.0 moles, $SiO_2$ of 0.1 moles to 2.0 moles, and borosilicate glass of 0.5 moles to 3.0 moles, where Re includes at least one selected from the group consisting of Y, Ho and Dy. Thus, the dielectric ceramic composition can be sintered at a relatively low sintering temperature ranging from 1050° C. to 1100° C., and have an excellent hot IR characteristic.

Each dielectric layer 102 is not particularly limited to its thickness, but has a thickness of 2 μm in order to realize a high-capacity capacitor having an ultra thin thickness. Preferably, the thickness of each dielectric layer 102 ranges from 0.5 μm to 2 μm. The number of dielectric layers 102 is not particularly limited, but is more than 400 in order to realize a super high-capacity capacitor. Preferably, the number of dielectric layers 102 ranges from 400 to 1000.

Each of the internal electrodes 101 and 103 makes use of conductive material, and preferably metal. However, since the dielectric layers 102 have non-reducibility, either nickel (Ni) or Ni alloy having relatively excellent conductivity is preferably used as the material for the internal electrodes 101 and 103. The external electrodes 104 and 105 can be formed of Cu or Ni.

The MLCC 100 can be fabricated by producing a slurry from the dielectric ceramic composition, forming the slurry into a green sheet, printing the internal electrodes on the green sheet, and performing well-known methods, such as stacking, compressing and sintering, on the printed green sheet.

EXAMPLES

A dielectric ceramic composition and a multilayer ceramic capacitor (MLCC) using the same according to the invention were produced. Particularly, the MLCC was fabricated in the same process using a conventional dielectric ceramic composition, followed by comparative analysis between the two MLCCs. In order to observe physical properties, the MLCCs were manufactured as sample chip capacitors having a small number of dielectric layers. That is, the MLCCs were fabricated by stacking, one on another, 10 dielectric sheets, each of which had a thickness of about 3 μm, and on each of which internal electrodes were printed.

First, total six (6) glass frits A1 to A6 were prepared using borosilicate glasses having different contents as in Table 1 below. As for the borosilicate glass, one borosilicate glass adequate for low-temperature sintering was selected from several borosilicate glasses expressed by a formula of $aR_{2O}$-$bB_2O_3$-$cSiO_2$, where $R_{2O}$ is the alkali oxide, which is at least one selected from the group consisting of $Li_2O$, $Na_2O$ and $K_2O$, where a+b+c=100, 5≦a≦20, 5≦b≦30, and 50≦c≦80.

Each glass frit was prepared by weighing respective components having contents as reported in Table 1 below, sufficiently mixing the components, and melting, at a temperature ranging from 1400° C. to 1500° C., quenching, dry-grinding, and heat-treating the ground glass powder.

TABLE 1

| Glass frit | Component (mol) | | |
|---|---|---|---|
|  | $R_2O$ | $B_2O_3$ | $SiO_2$ |
| A1 | 5 | 30 | 65 |
| A2 | 10 | 20 | 70 |
| A3 | 10 | 25 | 65 |
| A4 | 15 | 20 | 65 |
| A5 | 20 | 10 | 70 |
| A6 | 20 | 20 | 60 |

Both the sub-components other than the borosilicate glass and the main component $BaTiO_3$ were weighed as Table 2 below together with the glass frit prepared as above, and were mixed and dispersed with an organic solvent. $Re_2O_3$ was obtained by selecting one from $Y_2O_3$, $Ho_2O_3$ and $Dy_2O_3$.

TABLE 2

| No. | Sub-component (based on 100 moles of main component) | | | | | | | | |
|---|---|---|---|---|---|---|---|---|---|
|  | MI* | | | | | | | Glass | |
|  | $BaTiO_3$ | MgO | $Re_2O_3$ | MnO | $V_2O_5$ | BaO | $SiO_2$ | Frit | Content |
| Comp. 1 | 100 | 1.5 | 0.6 | 0.3 | 0.1 | 1.0 | 1.5 | — | 0 |
| Comp. 2 | 100 | 1.5 | 0.6 | 0.3 | 0.1 | 2.0 | 2.0 | — | 0 |
| Comp. 3 | 100 | 1.5 | 0.6 | 0.25 | 0.1 | 0.6 | 0 | A1 | 1.7 |
| Comp. 4 | 100 | 1.5 | 0.6 | 0.25 | 0.1 | 0.6 | 0.05 | A1 | 1.7 |
| Comp. 5 | 100 | 1.5 | 0.6 | 0.25 | 0.1 | 0.6 | 2.1 | A1 | 1.7 |
| Comp. 6 | 100 | 1.0 | 0.8 | 0.25 | 0.1 | 0.8 | 0 | A4 | 1.7 |
| Comp. 7 | 100 | 1.5 | 0.8 | 0.3 | 0.1 | 0.8 | 0 | A6 | 1.0 |
| Comp. 8 | 100 | 1.5 | 0.8 | 0.3 | 0.1 | 0.8 | 0 | A6 | 2.0 |
| Exam. 1 | 100 | 1.5 | 0.6 | 0.25 | 0.1 | 0.6 | 0.2 | A1 | 1.3 |
| Exam. 2 | 100 | 1.5 | 0.6 | 0.25 | 0.1 | 0.6 | 0.5 | A1 | 1.7 |
| Exam. 3 | 100 | 0.8 | 1.0 | 0.1 | 0.1 | 1.0 | 0.15 | A2 | 2.0 |
| Exam. 4 | 100 | 1.0 | 1.0 | 0.1 | 0.1 | 0.5 | 0.5 | A3 | 1.5 |
| Exam. 5 | 100 | 1.0 | 0.8 | 0.25 | 0.1 | 0.1 | 0.3 | A4 | 1.0 |
| Exam. 6 | 100 | 1.0 | 0.8 | 0.25 | 0.1 | 0.8 | 0.3 | A4 | 1.7 |
| Exam. 7 | 100 | 1.5 | 1.0 | 0.2 | 0.1 | 0.6 | 0.6 | A4 | 2.0 |
| Exam. 8 | 100 | 1.5 | 1.0 | 0.2 | 0.1 | 0.6 | 1.0 | A4 | 2.6 |
| Exam. 9 | 100 | 1.0 | 0.6 | 0.3 | 0.1 | 0.5 | 0.5 | A5 | 1.8 |
| Exam. 10 | 100 | 1.0 | 0.6 | 0.3 | 0.1 | 0.5 | 1.0 | A5 | 1.8 |
| Exam. 11 | 100 | 1.5 | 0.8 | 0.3 | 0.1 | 0.8 | 0.4 | A6 | 2.0 |
| Exam. 12 | 100 | 1.3 | 0.5 | 0.25 | 0.1 | 0.6 | 0.2 | A6 | 1.5 |
| Exam. 13 | 100 | 1.7 | 0.5 | 0.25 | 0.1 | 0.6 | 0.2 | A6 | 1.0 |
| Exam. 14 | 100 | 1.7 | 0.5 | 0.25 | 0.1 | 0.6 | 1.0 | A6 | 0.5 |

Note:
1) Comp. is short for Comparative Example.
2) Exam. is short for Example.

An organic binder was added to and mixed with each dielectric ceramic composition having components as reported in Table 2 above, thereby forming slurry. The slurry was coated on a molded film at a thickness of about 3 μm, thereby forming a dielectric sheet, on which Ni internal electrodes were printed. Ten (10) dielectric sheets, on which the internal electrodes were printed, were stacked one on another, and molded sheets having no internal electrode were additionally layered on top and bottom.

The resultant stack was subjected to cold isostatic press (CIP) under a pressure of 1000 kgf/cm² at 85° C. for 15 min, and was cut into pieces. The pieces were heat treated at 400° C. for 4 hours or more, thereby removing the organic binder, the dispersing agent and the like, and were sintered at different temperatures within the range from 1000° C. to 1150° C. in a temperature/atmosphere controllable sintering furnace. In the sintering atmosphere, an oxygen fraction was controlled to be atmospheric pressure ranging from $10^{-11}$ to $10^{-12}$ atm. After the sintering, the pieces were coated with Cu external electrodes, followed by electrode sintering at a temperature ranging from 780° C. to 900° C., and then by plating, thereby completing the process. After a predetermined time had lapsed, electrical properties were measured from the fabricated pieces.

In order to examine the electrical properties of the pieces, variations in the capacitance and the dielectric loss of the pieces were measured using a capacitance meter (4278A, available from Agilent Technology), by varying the AC voltages within the range from 0.01 to 10V. Particularly, the capacitance and the dielectric loss were obtained in the condition that the voltage per unit thickness applied to the dielectric piece was 1 V/μm. The obtained capacitance, the average thickness of the dielectric layers (sheets), the number of the stacked dielectric layers, the area of the electrodes, and the like were inserted into Equation 1 below, thereby producing dielectric constants of the dielectrics according to respective sintering temperatures.

$$C = \epsilon_r \cdot \epsilon_0 \cdot N \cdot S / t_d \quad \text{Equation 1}$$

In Equation 1 above, C is the capacitance, $\epsilon_r$ is the dielectric constant of the dielectric, $\epsilon_0$ is the dielectric constant of vacuum, N is the number of layers, S is the area of the electrode, and $t_d$ is the thickness of the dielectric layer.

Hot IR, that is, high temperature insulation resistance was evaluated using a Hot IR testing facility at a constant temperature of 150° C. The insulation resistance was measured by setting 6.3V/μm (when 6V was applied per unit thickness of the dielectric) to a rated voltage 1 Vr. Here, the critical breakdown voltage of each piece was set to be a voltage when the insulation resistance of the piece dropped to or below $10^5 \Omega$ according to application voltages (DC voltages) boosted every 30 minutes.

In order to examine the temperature dependency of dielectric constant, capacitance variation within a range from −55° C. to 135° C. using a TCC tester (4220A test chamber). In order to check whether or not the X5R characteristics were met, the variation in the capacitance at 85° C. on the basis of the capacitance at 25° C. was set as representative value. According to this process, the electric characteristics of Comparative Examples 1 to 8 and Examples 1 to 14 were evaluated, and the results are reported in Table 3 below.

TABLE 3

| No. | ST[1] (° C.) | DC[2] | DL[3] (%) | HTTV[4] (Vr) | TCC[5] (85° C.) (%) | Remarks |
| --- | --- | --- | --- | --- | --- | --- |
| Comp. 1 | 1150 | 4300 | 14.2 | 9.0 | −12.2 | high temperature sintering |
|  | 1130 | — | — | — | — | No sintering |
| Comp. 2 | 1170 | 3950 | 9.6 | 7.0 | −10.9 | high temperature sintering |
|  | 1150 | — | — | — | — | No sintering |
| Comp. 3 | 1100 | 3370 | 9.8 | 4.0 | −6.3 | Poor hot IR |
| Comp. 4 | 1100 | 3520 | 10.3 | 4.0 | −5.1 |  |
| Comp. 5 | 1130 | 3790 | 13.3 | 6.0 | −9.8 | high temperature sintering |
|  | 1110 | — | — | — | — | No sintering |
| Comp. 6 | 1080 | 3800 | 10.3 | 4.0 | −6.9 | Poor hot IR |
| Comp. 7 | 1080 | 3230 | 6.1 | 3.0 | −1.7 |  |
| Comp. 8 | 1060 | 2960 | 7.9 | 2.5 | −2.5 |  |
| Exam. 1 | 1080 | 3860 | 11.3 | 6.5 | −6.9 | No |
| Exam. 2 | 1070 | 4010 | 11.6 | 7.5 | −6.5 | No |
| Exam. 3 | 1080 | 3560 | 9.6 | 7.0 | −5.0 | No |
| Exam. 4 | 1060 | 4000 | 8.0 | 8.0 | −3.6 | No |
| Exam. 5 | 1090 | 4100 | 11.6 | 8.0 | −6.8 | No |
| Exam. 6 | 1050 | 4250 | 10.6 | 8.5 | −4.7 | No |
| Exam. 7 | 1070 | 3650 | 8.1 | 7.5 | −2.8 | No |
| Exam. 8 | 1090 | 2950 | 5.2 | 6.0 | +2.6 | No |
| Exam. 9 | 1070 | 4150 | 6.5 | 8.0 | −5.0 | No |
| Exam. 10 | 1060 | 4350 | 7.4 | 7.0 | −8.5 | No |
| Exam. 11 | 1060 | 3450 | 9.0 | 6.0 | −4.9 | No |
| Exam. 12 | 1050 | 4370 | 10.2 | 8.0 | −2.9 | No |
| Exam. 13 | 1090 | 3860 | 11.3 | 7.0 | −6.3 | No |
| Exam. 14 | 1100 | 4230 | 12.4 | 7.5 | −8.2 | No |

Note:
[1] sintering Temp,
[2] dielectric constant,
[3] dielectric loss,
[4] high-temperature critical voltage (where lVr = 6.3 V/μm)
[5] temperature coefficient of capacitance Referring to Table 3 above, Examples 1 to 14, manufacture according to the invention, showed excellent sintering characteristics at 1100° C. or less. In particular, Examples 4, 6, 9 and 12 had not only very excellent sintering characteristics but also high dielectric constant and stable TCC at 1100° C. or less. In addition, the hot IR was excellently improved, compared to Comparative Examples. These features can also be expected from a multilayer dielectric capacitor having a large number of layers according to the invention. That is, the dielectric capacitor can be fabricated by the low temperature sintering, meet the X5R characteristics (−55° C. to 85° C., ΔC=±15% or less), and have excellent hot IR.

However, in the case where the borosilicate glass was not used (Comparative Examples 1 and 2), where the borosilicate glass was used, but $SiO_2$ was not used (Comparative Examples 3, 6, 7 and 8), or where $SiO_2$ was not added at the proper range value (Comparative Examples 4 and 5), it could be found that the samples were sintered at a high temperature, but not at a low temperature, and that the samples were vulnerable to the hot IR characteristic.

While the present invention has been shown and described in connection with the exemplary embodiments, it will be apparent to those skilled in the art that modifications and variations can be made without departing from the spirit and scope of the invention as defined by the appended claims.

What is claimed is:

1. A dielectric ceramic composition for low-temperature sintering and hot insulation resistance, comprising:
   a main component $BaTiO_3$; and
   sub-components, based on 100 moles of the main component, MgO of 0.5 moles to 2.0 moles, $Re_2O_3$ of 0.3 moles to 2.0 moles, MnO of 0.05 moles to 0.5 moles, $V_2O_5$ of 0.01 moles to 0.5 moles, BaO of 0.3 moles to 2.0 moles, $SiO_2$ of 0.1 moles to 2.0 moles, and borosilicate glass of 0.5 moles to 3.0 moles, where Re includes at least one selected from the group consisting of Y, Ho and Dy.

2. The dielectric ceramic composition of claim 1, wherein the borosilicate glass includes $R_2O$, $B_2O_3$, and $SiO_2$, where R is an alkali metal.

3. The dielectric ceramic composition of claim 2, wherein the alkali metal includes at least one selected from the group consisting of Li, Na and K.

4. The dielectric ceramic composition of claim 1, wherein the borosilicate glass is expressed by a formula of $aR_2O$-$bB_2O_3$-$cSiO_2$, where R is the alkali metal, and a+b+c=100, where 5≦a≦20, 5≦b≦30, and 50≦c≦80.

5. The dielectric ceramic composition of claim 1, wherein the $BaTiO_3$ includes particles having an average diameter ranging from 150 nm to 300 nm.

6. The dielectric ceramic composition of claim 1, wherein the borosilicate glass includes particles having an average diameter ranging from 150 nm to 200 nm.

7. The dielectric ceramic composition of claim 1, wherein the $SiO_2$ includes particles having an average diameter ranging from 10 nm to 200 nm.

8. The dielectric ceramic composition of claim 1, wherein the low-temperature sintering is performed at a temperature ranging from 1050° C. to 1100° C.

9. A multilayer ceramic capacitor comprising:
a plurality of dielectric layers;
internal electrodes formed between the dielectric layers; and
external electrodes electrically connected to the internal electrodes,
wherein each dielectric layer comprises a dielectric ceramic composition for low-temperature sintering and hot insulation resistance, and
the dielectric ceramic composition comprises:
a main component $BaTiO_3$; and
sub-components, based on 100 moles of the main component, MgO of 0.5 moles to 2.0 moles, $Re_2O_3$ of 0.3 moles to 2.0 moles, MnO of 0.05 moles to 0.5 moles, $V_2O_5$ of 0.01 moles to 0.5 moles, BaO of 0.3 moles to 2.0 moles, $SiO_2$ of 0.1 moles to 2.0 moles, and borosilicate glass of 0.5 moles to 3.0 moles, where Re includes at least one selected from the group consisting of Y, Ho and Dy.

10. The multilayer ceramic capacitor of claim 9, wherein each internal electrode includes nickel (Ni) or Ni alloy.

11. The multilayer ceramic capacitor of claim 9, wherein each external electrode includes copper (Cu) or nickel (Ni).

12. The multilayer ceramic capacitor of claim 9, wherein each dielectric layer has a thickness ranging from 0.5 μn to 2 μm.

* * * * *